(12) United States Patent
Belcher et al.

(10) Patent No.: US 7,064,656 B2
(45) Date of Patent: Jun. 20, 2006

(54) ACCESS CONTROL FOR VEHICLE MOUNTED COMMUNICATIONS DEVICES

(76) Inventors: Brian E. Belcher, 2 Trail Ridge Dr., Melissa, TX (US) 75454; Larry L. Alexander, 9817 Estate La., Dallas, TX (US) 75238

( * ) Notice: Subject to any disclaimer, the term of this patent is extended or adjusted under 35 U.S.C. 154(b) by 242 days.

(21) Appl. No.: 10/055,122

(22) Filed: Jan. 22, 2002

(65) Prior Publication Data

US 2003/0139205 A1 Jul. 24, 2003

(51) Int. Cl.
*B60Q 1/00* (2006.01)
(52) U.S. Cl. .............................. 340/425.5; 340/426.2; 455/88
(58) Field of Classification Search ............ 340/425.5, 340/686.6, 426.1, 426.2; 455/88, 456.1, 455/422.1, 99, 411, 405, 425, 431
See application file for complete search history.

(56) References Cited

U.S. PATENT DOCUMENTS

| | | | | |
|---|---|---|---|---|
| 4,529,429 A | * | 7/1985 | Wood | ........................ 65/29.1 |
| 5,148,153 A | * | 9/1992 | Haymond | ................... 345/168 |
| 5,541,572 A | * | 7/1996 | Okamoto et al. | ........... 340/438 |
| 5,548,764 A | | 8/1996 | Duley et al. | ................. 395/750 |
| 5,757,359 A | * | 5/1998 | Morimoto et al. | .......... 345/156 |
| 5,815,407 A | | 9/1998 | Huffman et al. | .............. 702/57 |
| 5,835,868 A | * | 11/1998 | McElroy et al. | ............... 701/2 |
| 5,949,345 A | * | 9/1999 | Beckert et al. | ........ 340/815.41 |
| 6,018,294 A | | 1/2000 | Vogel et al. | ................. 340/456 |
| 6,026,922 A | | 2/2000 | Horton | ....................... 180/287 |
| 6,098,174 A | | 8/2000 | Baron et al. | ................. 713/300 |
| 6,119,237 A | | 9/2000 | Cho | ........................ 713/300 |
| 6,222,458 B1 | * | 4/2001 | Harris | ........................ 340/686.6 |
| 6,415,224 B1 | * | 7/2002 | Wako et al. | ................. 701/208 |
| 6,556,810 B1 | * | 4/2003 | Suzuki | ........................ 455/88 |
| 6,580,372 B1 | * | 6/2003 | Harris | ..................... 340/686.6 |
| 6,690,940 B1 | * | 2/2004 | Brown et al. | ............ 455/456.4 |

\* cited by examiner

*Primary Examiner*—Phung T. Nguyen
(74) *Attorney, Agent, or Firm*—Michael R. Nichols; James O. Dixon

(57) ABSTRACT

Disclosed is a controller to prevent access or utilization by a vehicle operator to communications devices installed on the vehicle when the vehicle is in motion thereby reducing distractions of the operator.

23 Claims, 1 Drawing Sheet

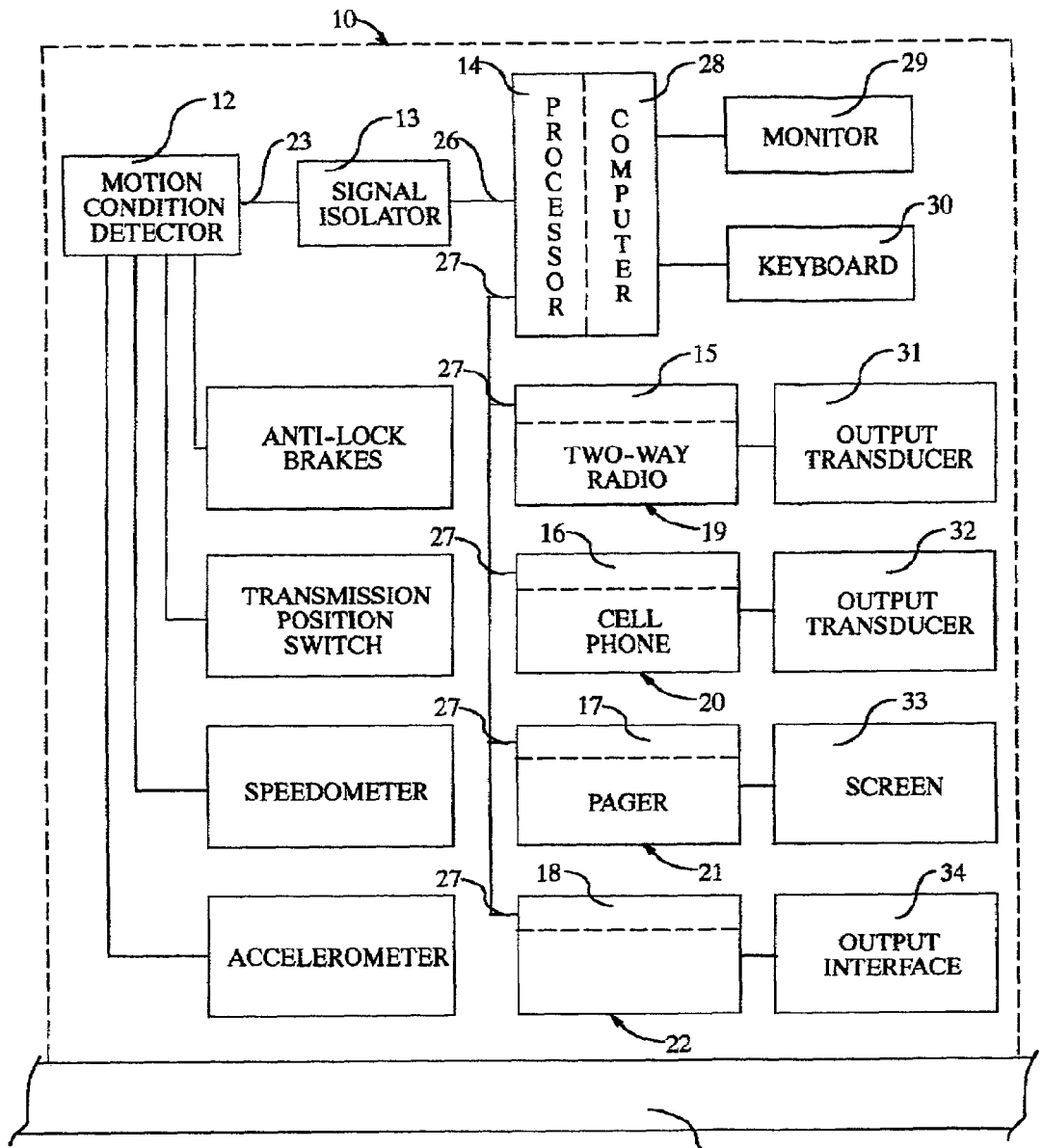
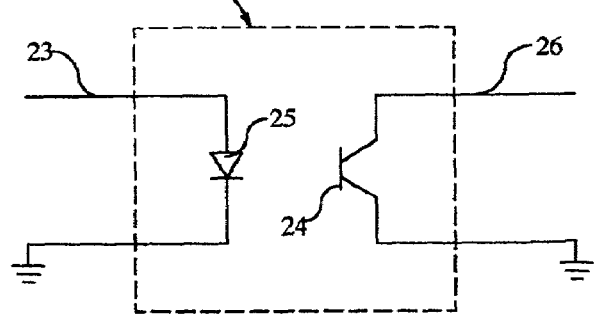
FIG. 1
FIG. 2

ACCESS CONTROL FOR VEHICLE MOUNTED COMMUNICATIONS DEVICES

TECHNICAL FIELD

The present invention relates to vehicle safety devices and more particularly to a utilization controller for vehicle borne communications devices to avoid distraction of the vehicle operator.

BACKGROUND OF INVENTION

Use of vehicle mounted mobile communications devices has become widespread especially on dispatched service vehicles needing instructions, work orders, geographical directions, maps and other visual or aural data and on vehicles relying on location by satellite positioning systems.

The use of vehicle mounted computers and other mobile communications devices such as cell phones, pagers, cb radios and various other types of information devices can easily be a distraction to the operator of the vehicle on which the devices are mounted when that vehicle is in motion. Such distractions may be so great as to be seriously hazardous. This is especially true when the devices require the vehicle operator's visual attention, reaction to an alarm condition or other physical response.

Although sometimes necessary, in most instances it is truly unnecessary to operate such vehicle mounted information devices while the vehicle is moving or is in a condition that movement may be initiated inadvertently or with little conscious effort on the part of the operator. Thus there is a need for a device to restrict a vehicle operator's ability to operate or even monitor the output of the mobile communications devices on the vehicle unless the vehicle is not moving and is in a "safe" stopped condition.

SUMMARY OF THE INVENTION

The present invention provides an access (utilization) controller to restrict or block visual or aural interaction between a vehicle operator/driver and mobile communications and information devices such as computers, pagers, cell phones and the like mounted on the vehicle. The utilization controller comprises sensors to detect motion or "potential" motion of the vehicle, a processor receiving data from the sensor and inhibitor means responsive to the processor to "blank out" any distracting visual or audial output from the communications or information devices while the vehicle is in motion or about to move. The sensor data may be derived from special sensors such as accelerometers installed on the vehicle for that purpose or from other sensors already on the vehicle as part of other systems such as antilock brakes, transmission interlocks, speedometers and cruise control systems and others.

The processor may be a programmable or hardwire processor dedicated for that purpose or a programmable computer such as a PC, having other communications and control functions. The inhibitor means may be means in the controlled devices responsive to processor outputs to temporarily block device outputs that may be dangerously distracting to the vehicle operator at that time.

BRIEF DESCRIPTION OF THE DRAWINGS

A better understanding of the present invention may be had from reading the following detailed description with reference to the accompanying drawings wherein:

FIG. 1 is a block diagram of the access controller of the present invention showing the various elements of the controller and illustrating their interactive relationships; and FIG. 2 is a schematic diagram of an opto-isolater useful in the present invention.

DETAILED DESCRIPTION OF THE INVENTION

Referring now to FIG. 1 there is shown in block diagram the access controller system 10 of the present invention mounted on a vehicle represented by the block 11. The system 10 comprises one or more vehicle motion condition detectors 12, a signal isolator 13, a processor 14, and output blanking devices 15 through 18 associated with various mobile communications devices 19–20 onboard the vehicle to be controlled by the system as to access or utilization.

The motion condition detector 12 may be a separate device such as any commercially available accelerometer installed on the vehicle especially for the purpose. Or it may be any of several signal generating devices or systems commonly used on vehicles for other purposes. Such devices might be, for example, an interlock switch system providing a signal indicative of the transmission in the neutral or park position, an antilock brake system producing a signal indicative of vehicle wheel in motion or an electrical speedometer providing a signal indicative of vehicle motion.

The motion indicator signal or signals from the motion condition detector 12 are applied to signal isolator 13 via line 23. Signal isolator/conditioner 13 may comprise an optical isolator as depicted schematically in FIG. 2. In the integrated opto-isolator an integral photo transistor is used as a signal level detection and isolation switching device. Signal current from line 23 applied to the light emitting diode 25 causes the diode to produce light activating or "switching" transistor 24. Thus there is produced a binary output on line 26 from the optoisolator indicative of either a "open" or a "closed" switch condition.

The signal on line 26 is applied to processor 14 which may be a "stand alone" programmable processor 14 generating appropriate access control signals on line 27 to blanking devices 15, 16, 17 and 18 associated with communications devices 19, 20, 21 and 22 respectively, the utilizations of which are to be controlled. Blanking device 15 when activated shuts down output transducer 31 of radio 19; likewise device 16 controls output transducer 32 of cell phone 20, device 17 controls the screen 33 of pager 21 and device 18 controls the output interface 34 of auxiliary device 22.

Alternatively the utilization control signal processor may be embodied in computer 28 through software programming of the computer hardware. Computer 28 may be a "PC" or other type computer also used as a communications device and part of the vehicle system. The programming processor 14 includes utilization control of the computer user interfaces such as the monitor 29 and keyboard 30.

The software programming may include a safety feature in the form of a cable disconnect indicator indicating a disconnect of signal input line 26 from the processor. Should there be a disconnect indication processor 14 generates signals to blank all communication devices output 31 through 34 and monitor screen 29 and to disable inputs such as keyboard 30. Such a cable disconnect indicator makes it impossible or at least quite difficult for the vehicle operator to override the utilization control system by merely disconnecting line 26.

The software programming alluded to above to carry out the functions of the system may take any of several forms all within the ability of any reasonably competent programmer could produce. It will of course be in such form as to meet the requirements of the particular processor or computer employed in the system.

Thus there has been disclosed a system to control the usage by a vehicle operator of mobile communications devices mounted on or in a vehicle while the vehicle is in motion or in a condition of potential motion. Dangerous distractions of the vehicle operator by use of the communication devices during operation of the vehicle are thus avoided.

In summary signals indicative of current or imminent vehicle motion are generated and applied to a programmed signal processor. In response to the motion signal the processor disables the output or user interface of the communications devices controlled.

Although the present invention has been disclosed in its preferred embodiment many variations or modification still within the spirit of the invention will occur to those skilled in the art; this invention then is to be limited only as set forth in the following claims.

What is claimed is:

1. A utilization control system for limiting access by the operator of a vehicle to programmable computer having ports for delivering output signals to communications devices mounted on said vehicle comprising:
   at least one vehicle motion condition detector providing signals indicative of current motion of said vehicle and of potential motion of said vehicle;
   at least one signal processor responsive to signals provided by said at least one detector indicative of vehicle motion and potential vehicle motion to generate blanking signals;
   at least one vehicle mounted communications device; and
   at least one blanking device associated with said signal processor and said communications device responsive to said blanking signals and configured to shut down output from the computer ports to said communications device to prevent utilization or interaction with said at least one communications device by said vehicle operator.

2. The system of claim 1 wherein said at least one motion condition detector comprises a transmission park/neutral switch.

3. The system of claim 1 wherein said at least one signal processor comprises a programmable digital signal processor configured to deliver outputs to temporarily block device outputs that may be dangerously distracting to the vehicle operator at that time.

4. The system of claim 3 wherein said programmable digital signal processor is a "PC" type computer.

5. The system of claim 4 wherein said "PC" computer includes an output monitor and an input keyboard.

6. The system of claim 5 wherein said at least one motion condition detector comprises a transmission park/neutral switch.

7. The system of claim 1 wherein said at least one motion condition detector comprises an accelerometer.

8. The system of claim 1 wherein said at least one motion condition detector comprises an antilock brake system.

9. The system of claim 1 wherein said at least one motion condition detector comprises an electrical speedometer.

10. The system of claim 1 further comprising an optical isolater circuit in the signal path between said at least one vehicle motion condition detector and said at least one signal processor.

11. The system of claim 1, wherein the at least one signal processor is external to the at least one vehicle mounted communications device.

12. A utilization control system for limiting access by the operator of the vehicle to communications devices mounted on said vehicle comprising:
   a vehicle motion condition detector providing signals indicative of current motion of said vehicle and of potential motion of said vehicle said detector comprising a transmission park/neutral switch;
   a programmable digital computer used as a communication device on board said vehicle; and
   an optical isolater circuit in the signal path between said vehicle motion condition detector and said programmable digital computer, said computer being programmed to be responsive to said signals indicative of motion and of potential motion to generate blanking signals applied to said digital computer and limiting said operator's utilization of said computer.

13. The system of claim 12 wherein said blanking signals are additionally applied to others of said communication devices mounted on said vehicle.

14. The system of claim 13 wherein said others of said communications devices include voice communications devices.

15. The system of claim 13 wherein said others of said communications devices include visual communications devices.

16. The system of claim 12, wherein the blanking signals inhibit user input to the digital computer.

17. A method, executed by a computer, comprising:
   detecting a vehicle motion condition of a vehicle, wherein the vehicle motion condition indicates whether it is possible for the vehicle to be currently in motion; and
   in response to die vehicle motion condition indicating that it is possible for the vehicle to be currently in motion, disabling communications through at least one port of the computer with at least one peripheral device associated with the computer so as to prevent interaction of the computer with a user of the computer.

18. The method of claim 17, wherein the vehicle motion condition is detected through a sensor configured to communicate with the computer.

19. The method of claim 18, wherein the sensor senses a status of a transmission park/neutral switch associated with the vehicle.

20. The method of claim 18, further comprising:
   determining whether the sensor can currently communicate with the computer; and
   in response to a determination that the sensor cannot currently communicate with the computer, disabling the at least one peripheral device.

21. The method of claim 18, wherein the sensor senses actual movement of the vehicle.

22. The method of claim 17, wherein the at least one peripheral device includes a user input device.

23. The method of claim 17 wherein the at least one peripheral device includes an output device.

* * * * *